United States Patent
Gaspar et al.

(10) Patent No.: US 11,685,443 B2
(45) Date of Patent: Jun. 27, 2023

(54) HYDROELASTIC BODY MOUNT

(71) Applicant: The Pullman Company, Milan, OH (US)

(72) Inventors: Zoren E. Gaspar, Huron, OH (US); Donald E. Schank, Bellevue, OH (US); Scott W. Rawlings, North Ridgeville, OH (US)

(73) Assignee: The Pullman Company, Milan, OH (US)

( * ) Notice: Subject to any disclaimer, the term of this patent is extended or adjusted under 35 U.S.C. 154(b) by 468 days.

(21) Appl. No.: 16/935,552

(22) Filed: Jul. 22, 2020

(65) Prior Publication Data

US 2022/0024520 A1    Jan. 27, 2022

(51) Int. Cl.
*B62D 24/04*      (2006.01)
*F16F 13/14*      (2006.01)

(52) U.S. Cl.
CPC .............. *B62D 24/04* (2013.01); *F16F 13/14* (2013.01); *F16F 2224/02* (2013.01); *F16F 2224/0208* (2013.01)

(58) Field of Classification Search
CPC ...... B62D 24/04; F16F 13/14; F16F 2224/02; F16F 2224/0208; F16F 1/3849; F16F 13/22; F16F 13/04; F16F 13/06; F16F 13/08; F16F 13/10
USPC ....... 248/605, 606, 618, 619, 631, 565, 562, 248/560, 575, 576, 632, 634
See application file for complete search history.

(56) References Cited

U.S. PATENT DOCUMENTS

| | | |
|---|---|---|
| 6,557,836 B2 | 5/2003 | Itoh |
| 7,922,156 B2 | 4/2011 | Goudie |
| 8,231,115 B2 | 7/2012 | Goudie et al. |
| 9,222,543 B2 | 12/2015 | Saito et al. |
| 9,470,286 B2 | 10/2016 | Saito et al. |

(Continued)

FOREIGN PATENT DOCUMENTS

| | | |
|---|---|---|
| JP | 2007085376 A | 4/2007 |
| JP | 4081421 B2 | 4/2008 |

(Continued)

OTHER PUBLICATIONS

International Search Report and Written Opinion regarding International Application No. PCT/US2021/033997, dated Sep. 17, 2021.

*Primary Examiner* — Terrell L Mckinnon
*Assistant Examiner* — Michael McDuffie
(74) *Attorney, Agent, or Firm* — Harness, Dickey & Pierce, P.L.C.

(57) ABSTRACT

A body mount comprises a first support member adapted to engage a body of a vehicle and a second support member adapted to engage a frame of the vehicle. The second support member includes a tubular portion disposed radially inward of a second support surface. A first elastomeric spring interconnects an inner tube and the second support member. The first elastomeric spring is positioned within the tubular portion. A hydraulic damping system is disposed on a side of the second support surface opposite the first support member and includes a housing coupled to the second support member. Second, third and fourth elastomeric springs are positioned within the housing. The second elastomeric spring and the third elastomeric spring are spaced apart by a first track. The third elastomeric spring and the fourth elastomeric spring are spaced apart by a second track.

20 Claims, 5 Drawing Sheets

(56) References Cited

U.S. PATENT DOCUMENTS

| | | |
|---|---|---|
| 9,850,977 B2 | 12/2017 | Gaspar et al. |
| 10,018,242 B2 | 7/2018 | Bradshaw et al. |
| 10,150,510 B2 | 12/2018 | Baluch |
| 10,215,252 B2 | 2/2019 | Parr et al. |
| 10,309,480 B2 | 6/2019 | Snyder et al. |
| 10,663,028 B2 | 5/2020 | Robinson et al. |
| 2006/0261531 A1 | 11/2006 | Kim |
| 2012/0049428 A1 | 3/2012 | Moore et al. |
| 2016/0003322 A1 | 1/2016 | Bradshaw et al. |
| 2018/0148104 A1 | 5/2018 | Baluch |
| 2019/0170207 A1 | 6/2019 | Molesworth |

FOREIGN PATENT DOCUMENTS

| | | |
|---|---|---|
| JP | 4131410 B2 | 8/2008 |
| JP | 5364019 B2 | 12/2013 |
| JP | 5457261 B2 | 4/2014 |
| KR | 10-2010-0065871 A | 6/2010 |

HYDROELASTIC BODY MOUNT

FIELD

The present disclosure relates to body mounts, subframe mounts, engine mounts or other similar mounting systems. More particularly, the present disclosure relates to a body mount for systems requiring a low profile and restricted packaging space.

BACKGROUND

This section provides background information related to the present disclosure which is not necessarily prior art.

Fluid filled vibration damping mounts are utilized for automotive engine mounts, subframe mounts and body mounts. These damping mounts couple two components together while damping the vibrations between the components. Typically, there are two support surfaces that are precompressed against each other prior to the working load being applied to the mounting system. Often the amount of packaging space for such mounts is limited. Assembly of the mount to the vehicle may be challenging. A need exists for a light-weight one-piece mount that fits into such a restricted packaging space while providing desired damping and travel-limiting characteristics.

SUMMARY

This section provides a general summary of the disclosure, and is not a comprehensive disclosure of its full scope or all of its features.

A body mount comprises a first support member adapted to engage a body of a vehicle and a second support member adapted to engage a frame of the vehicle. The second support member includes a tubular portion disposed radially inward of a second support surface. A first elastomeric spring interconnects an inner tube and the second support member. The first elastomeric spring is positioned within the tubular portion. A hydraulic damping system is disposed on a side of the second support surface opposite the first support member and includes a housing coupled to the second support member. Second, third and fourth elastomeric springs are positioned within the housing. The second elastomeric spring and the third elastomeric spring are spaced apart by a first track. The third elastomeric spring and the fourth elastomeric spring are spaced apart by a second track.

In an another configuration, a mount body mount for connection between a body and a frame of a vehicle comprises a first support member defining a first support surface adapted to engage the body of the vehicle. An inner tube includes a first end and an opposite second end. The inner tube is connected to the first support member at the first end and extends axially away from the first support surface along a central axis. A second support member defines a second support surface adapted to engage the frame of the vehicle. The second support member is movable relative to the first support member and includes a tubular portion extending axially away from the second support surface and toward the first support surface. A first elastomeric spring interconnects the inner tube and the second support member. The first elastomeric spring is positioned within the tubular portion. A hydraulic damping system is disposed on a side of the second support surface opposite the first support surface. The hydraulic damping system includes a housing coupled to the second support member as well as second, third and fourth elastomeric springs positioned within the housing. The second elastomeric spring and the third elastomeric spring are spaced apart by a first track. The third elastomeric spring and the fourth elastomeric spring are spaced apart by a second track. The hydraulic damping system includes a first fluid chamber axially positioned between the second elastomeric spring and the third elastomeric spring and a second fluid chamber axially positioned between the third elastomeric spring and the fourth elastomeric spring. The first fluid chamber is continuously fluidly connected to the second fluid chamber via the first and second tracks.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
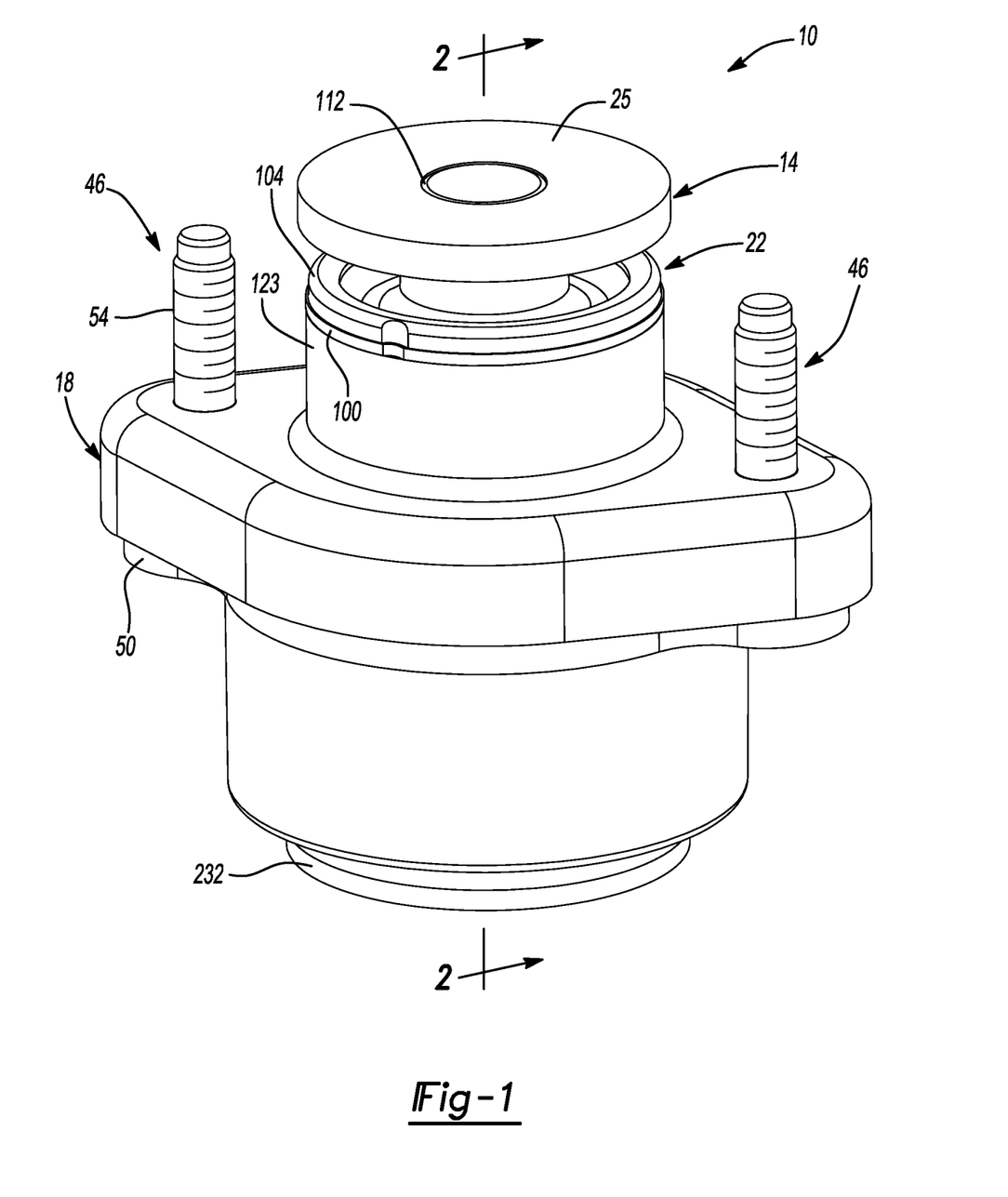
FIG. 1 is a perspective view of one embodiment of a mount of the present disclosure.

An exemplary mount 10 in accordance with the present disclosure is shown in FIG. 1. Mount 10 includes a first support member 14, a second support member 18, an upper spring assembly 22 and a lower spring assembly 24. Mount 10 can be connected between a body and a frame of a vehicle and oriented relative to the ground in the manner depicted in FIG. 1. In other applications, mount 10 may be placed between adjacent members in order to provide the vibration damping that will be explained in more detail below. The terms "upper" and "lower" need not limit the possible orientation of mount 10 relative to the ground.

First support member 14 is adapted to engage the body of the vehicle. First support member 14 includes a first support surface 25. First support surface 25 is adapted to be positioned adjacent to and in engagement with the vehicle body. First support surface 25 is a substantially planar surface and, in this example, is an annular surface. In the orientation shown in FIGS. 1 and 2, first support surface 25 is disposed at the top of mount 10 and the other elements extend away, or downwardly, from first support surface 25.

Second support member 18 is adapted to engage the vehicle frame. Second support member 18 includes a second support surface 28 that extends substantially parallel to first support surface. In this configuration, upper spring assembly 22 is positioned between first support surface 25 and second support surface 28. Lower spring assembly 24 is positioned on a side of second support surface 28 opposite first support member 14. In this manner, the vibration damping functionality of mount 10 can be realized when load is exerted on mount 10 through the body or the frame through the attachment points at first support surface 25 or second support surface 28, respectively.

Second support member 18 may be fixed to the vehicle frame via fasteners 46. Fasteners 46 are overmolded at a fixed position within a plastic housing 50. Plastic housing 50 and the other plastic components described later in this paper may be constructed from a nylon material or, optionally, a glass-filled nylon material. Other light-weight injection moldable materials may also be suitable. Each of fasteners 46 includes a threaded shank 54, an enlarged shoulder portion 60 and radially extending flange 64. A flat 68 is formed on each flange 64. Once fasteners 46 are embedded and partially encapsulated within plastic housing 50, flats 68 directly abut portions of housing 50 such that relative rotation between fasteners 46 and housing 50 is restricted. Each of fasteners 46 further includes a knurled portion 72 that engages second support member 18 in a pressed-fit arrangement to restrict rotation of fasteners 46 relative to second support member 18. A subsequent swaging or other mechanical deformation may be performed to further mechanically engage the metal material of second support member with each of fasteners 46. Threaded shanks 54 extend through apertures 76 of second support member 18. Second support member 18 may be stamped or otherwise formed from a constant thickness metal sheet of high strength steel such as 420 XLF.

Upper spring assembly 22 includes a first inner tube 80, an outer tube 84, and an elastomeric body 88. Elastomeric body 88 is constructed from an injection moldable elastomeric material such as natural rubber. Alternate materials include synthetics such as EPDM or Butyl rubber, also known as Isobutylene-isoprene (IIR). Other injection moldable elastomers may also be implemented. Body 88 is bonded to an external surface 92 of first inner tube 80. In similar fashion, body 88 is bonded to an inner cylindrical surface 96 of outer tube 84. Outer tube 84 includes a flange 100. Body 88 includes an annular bumper 104 overlapping flange 100. To reduce the mass of mount 10, outer tube 84 maybe constructed from a plastic material such as nylon or glass-reinforced nylon.

A relatively high magnitude load may be transferred between first support member 14 and first inner tube 80. Accordingly, first inner tube 80 is preferably constructed from metal. First support member 14 is shaped as a flat washer fixed to a first end 108 of first inner tube 80. A reduced thickness portion 112 of first inner tube 80 may be mechanically deformed into engagement with a curved surface 116 that defines an aperture extending through first support member 14. Other interconnection methods such as threaded engagement, welding or bonding are also contemplated. An opposite second end 120 of first inner tube includes an annular recess 122. First inner tube 80, body 88, outer tube 84 and first support member 14 are interconnected to one another to define upper spring assembly 22 that is coupled to second support member 18.

Figure 2:
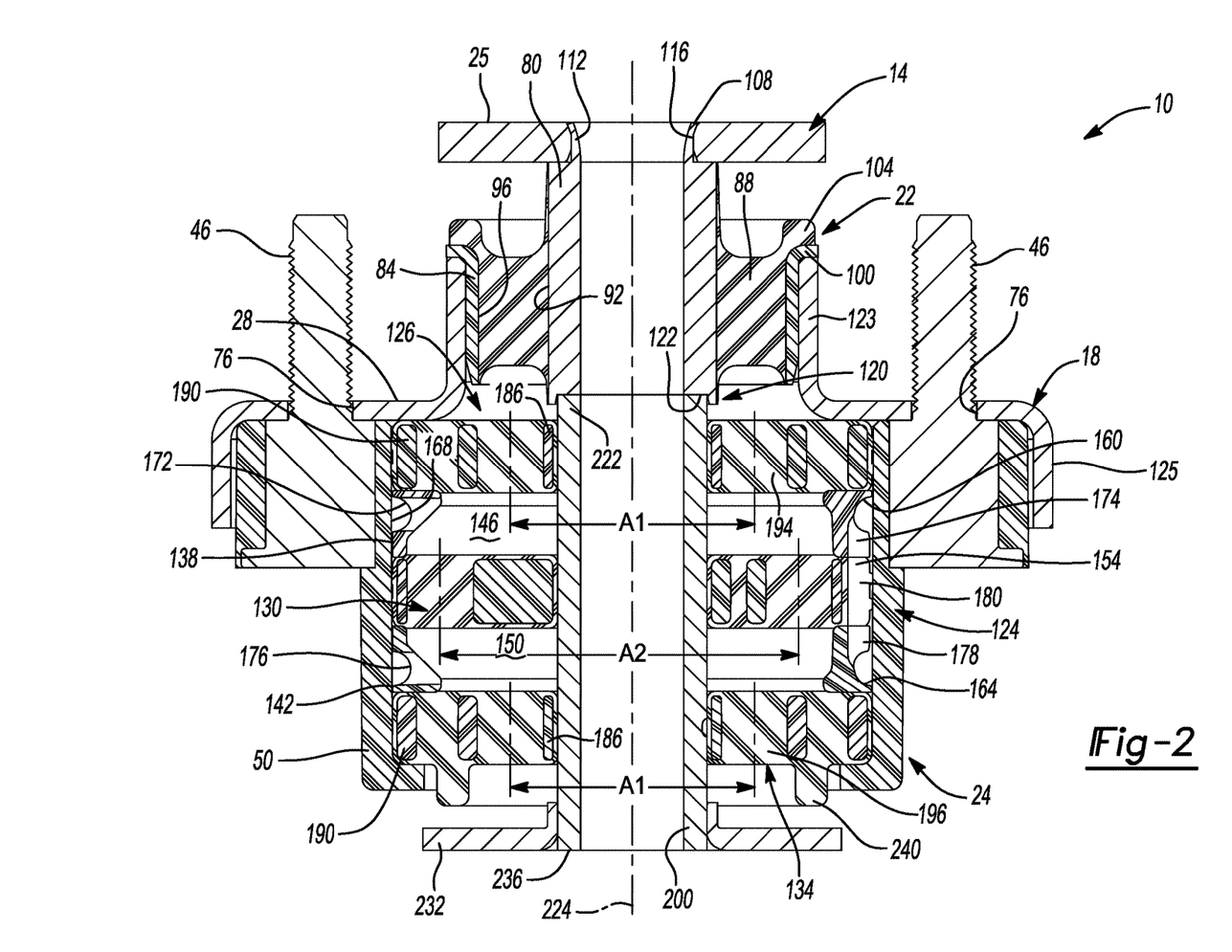
FIG. 2 is a cross-sectional view taken along line 2-2 of FIG. 1.
Figure 3:
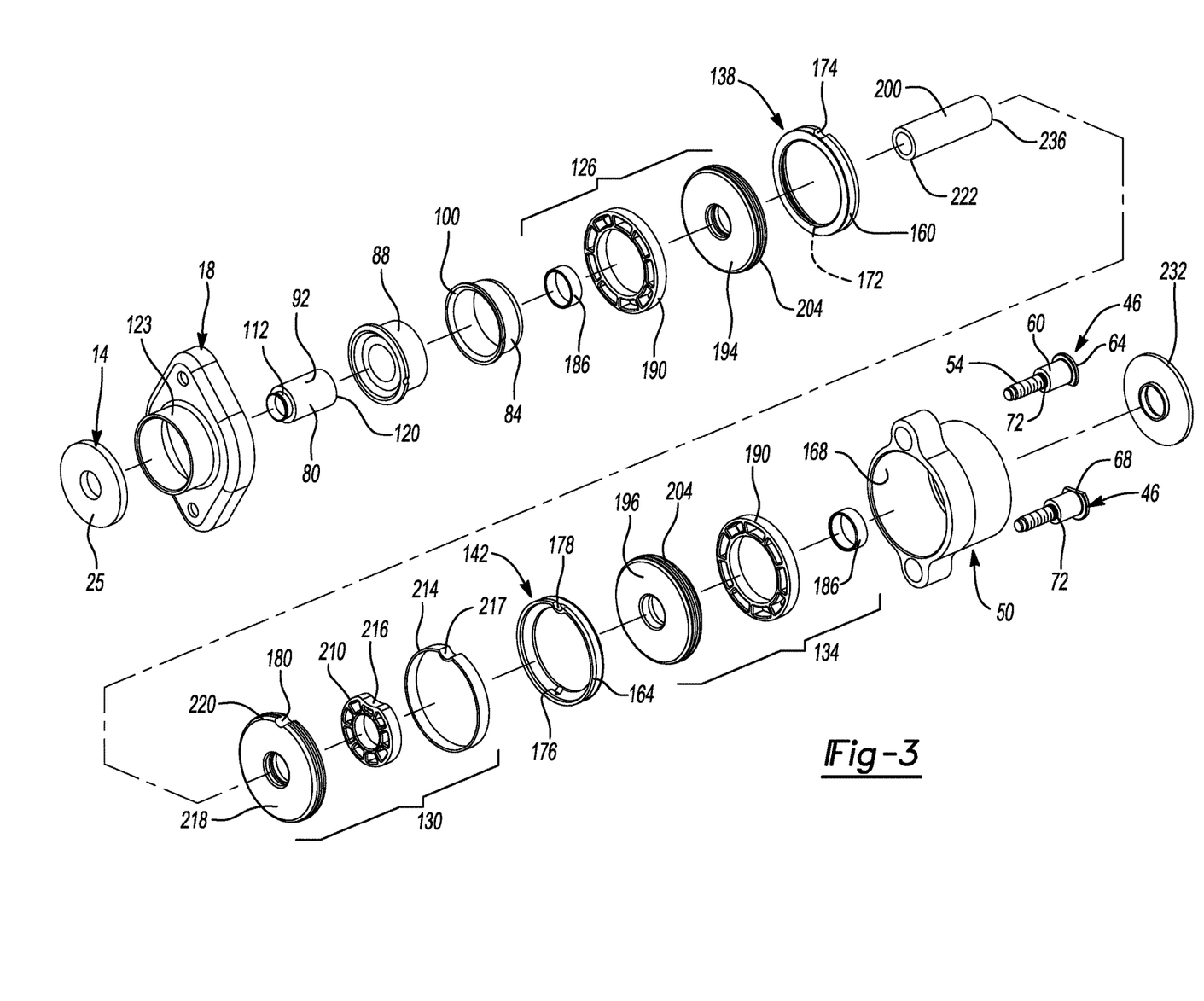
FIG. 3 is an exploded perspective view of the mount depicted in FIG. 1.

In the embodiment depicted in FIGS. 1-3, outer tube 84 is pressed into a cylindrically shaped boss 123 of second support member 18. Second support member 16 further includes a perimeter wall 125 extending from second support surface 28 in a direction opposite boss 123. Housing 50 is positioned within the confines of perimeter wall 125 and in engagement with second support member 18.

Certain elements of mount 10 combine to create a hydraulic damping system 124 that cooperates with upper spring assembly 22, also referenced as first elastomeric spring 22.

In particular, hydraulic damping system 124 includes lower spring assembly 24 comprising a second elastomeric spring 126, a third elastomeric spring 130, a fourth elastomeric spring 134, a first track 138, and a second track 142. Hydraulic damping system 124 further includes housing 50 and fasteners 46. Second, third and fourth elastomeric springs 126, 130, 134 are positioned within the housing 50. Second elastomeric spring 126 and third elastomeric spring 130 are spaced apart by first track 138. Third elastomeric spring 130 and fourth elastomeric spring 134 are spaced apart by second track 142.

Second elastomeric spring 126, first track 138, and third elastomeric spring 130 combine to at least partially define a first fluid chamber 146. Third elastomeric spring 130, second track 142 and fourth elastomeric spring 134 at least partially define a second fluid chamber 150. A non-compressible fluid fills both first fluid chamber 146 and second fluid chamber 150. The fluid is permitted to travel between first chamber 146 and second chamber 150 to provide damping of vibrations imposed on mount 10 via its connections at first support surface 25 and second support surface 28.

Fluid is permitted to travel between first chamber 146 and second chamber 150 via a passageway 154. Passageway 154 includes a first external groove 160 of first track 138, a second external groove 164 of second track 142 and an inner surface 168 of housing 50. A first aperture 172 is an opening that radially extends through first track 138 to fluidly connect first external groove 160 to first chamber 146. On the opposite side of first track 138, a first port 174 allows fluid to travel toward third elastomeric spring 130. A second aperture 176 radially extends through second track 142 to fluidly connect second external groove 164 with second fluid chamber 150. A second port 178 is formed on the opposite side of second track 142 as second aperture 176. A recess 180 is formed in third elastomeric spring 130 and rotationally positioned in fluid communication with first port 174 and second port 178. As can be appreciated and when the pressure in second chamber 150 is higher than the pressure in first chamber 146, fluid that is located in second chamber 150 flows into second external groove 164 via second aperture 176. The fluid then flows around second track 142 through second external groove 164 before reaching second port 178. Upon reaching second port 178, the fluid can further flow past third elastomeric spring 130 via recess 180 and flow into first port 174. Flow continues around second elastomeric spring through first external groove 160 and into first chamber 146. As can be further appreciated, fluid can flow in the reverse direction if the pressure in first chamber 146 is higher than the pressure in second chamber 150.

The damping characteristics of mount 10 can be varied and tuned by changing various aspects of hydraulic damping system 124. Some aspects of the system that can be changed or varied in order to tune or modify the damping characteristics include the length of external grooves 160, 164 and the size, quantity and location of apertures 172, 176 and ports 174,178.

Additional tuning opportunity exists based on the construction of second, third and fourth elastomeric springs 126, 130, 134. Second elastomeric spring 126 and fourth elastomeric spring 134 are substantially similar to one another and each include an inner ring 186 an outer ring 190 formed as rigid plastic components. In second elastomeric spring 126, inner ring 186 and outer ring 190 are encapsulated within an elastomeric diaphragm 194. An elastomeric diaphragm 196 encapsulates the inner and outer rings of fourth elastomeric spring 134. Each inner ring 186 is disposed proximate to a second inner tube 200 such that only a small annulus of elastomeric material is positioned between inner ring 186 and second inner tube 200. An interference fit exists between the second and fourth elastomeric springs and the second inner tube 200. Raised beads may be formed on the inner diameters of the elastomeric springs, if desired. It should be appreciated that the present embodiment utilizes first inner tube 80 and second inner tube 200 for assembly purposes and that a single one-piece inner tube may be implemented instead.

Outer ring 190 circumscribes inner ring 186 and is disposed in close proximity to inner surface 168 of housing 50. Beads 204 circumferentially extend about the perimeter of second and fourth elastomeric springs 126, 134 and are compressed to form seals through which the fluid does not pass. Based on the radial spacing between inner ring 186 and outer ring 190, each of the second and fourth elastomeric springs 126, 134 define a piston pumping area A1 as depicted in FIG. 2.

Third elastomeric spring 130 includes an inner ring 210, an outer ring 214 and a diaphragm 218. Inner ring 210 and outer ring 214 are rigid plastic components encapsulated within elastomeric diaphragm 218. Inner ring 210 is disposed proximate to second inner tube 200 such that only a small annulus of elastomeric material is positioned between inner ring 210 and second inner tube 200. An interference fit exists between third elastomeric spring 130 and second inner tube 200.

Outer ring 214 circumscribes inner ring 210 and is disposed in close proximity to inner surface 168 of housing 50. Inner ring 210 includes a recess 216 and outer ring 214 includes a recess 217 to help define recess 180. Beads 220 circumferentially extend about the perimeter of third elastomeric spring 130 and are compressed to form seals through which the fluid does not pass. Based on the radial spacing between inner ring 210 and outer ring 214, third elastomeric spring 130 defines a piston pumping area A2 as depicted in FIG. 2. If desired, piston pumping areas A1 are may be substantially smaller than piston pumping area A2. The difference in pumping areas may be set to tune the damping characteristics of mount 10.

Second inner tube 200 includes a first end 222 placed in abutting engagement with second end 120 of first inner tube 80. Second inner tube 200 is coaxially aligned with first inner tube 80 and positioned within recess 122 along a longitudinal axis 224. Load may be transferred along axis 224 in either direction depending on the forces acting on the vehicle body and the frame.

A travel limiter 232 is fixed to a second end 236 of second inner tube 200. A snubber 240 is shaped as an annular ring axially extending from and integrally formed with diaphragm 196. During certain loading conditions, travel limiter may be moved in to contact with snubber 240. Snubber 240 resists further axial movement of travel limiter 232 toward second support member 18.

Figure 4:
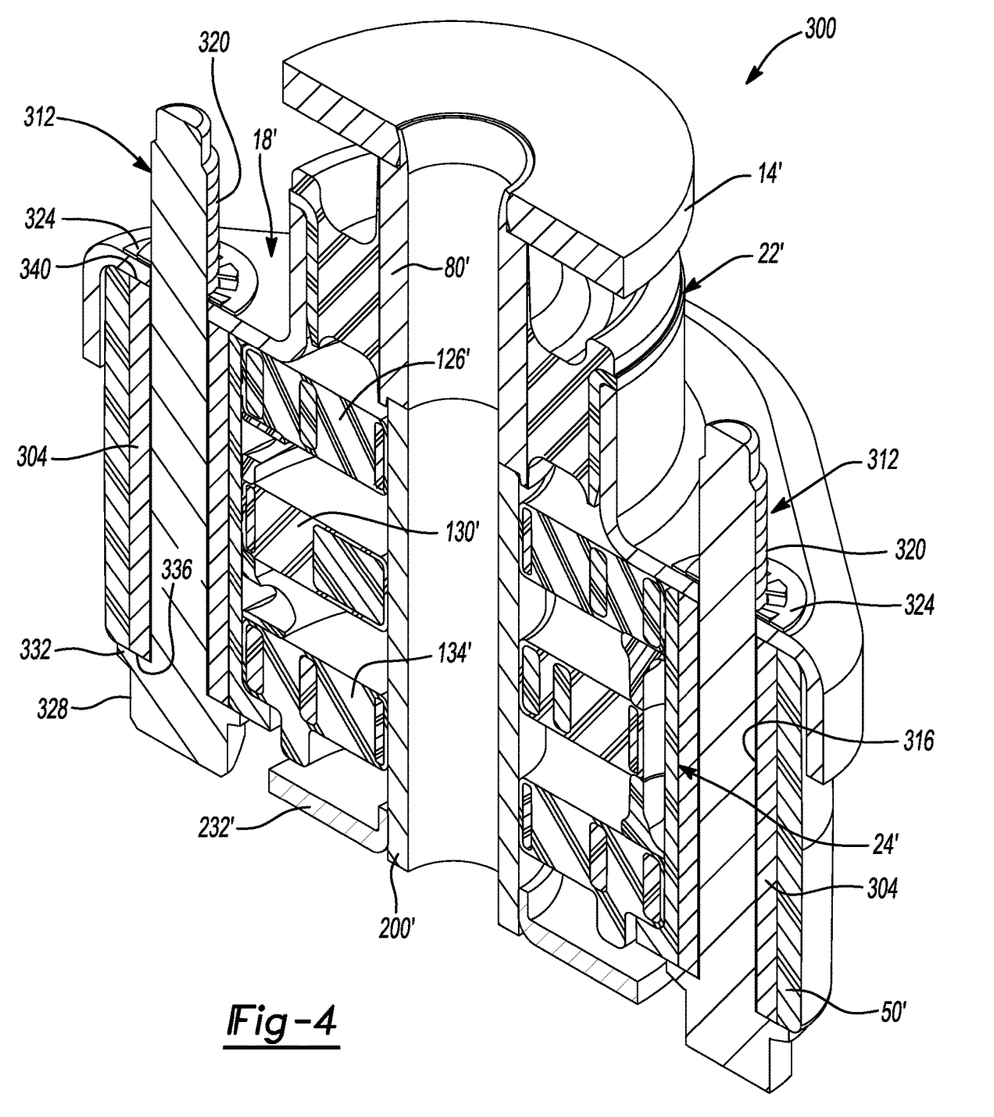
FIG. 4 is a perspective sectional view of an alternate embodiment mount.

FIG. 4 depicts an alternate mount 300. Mount 300 is substantially similar to mount 10 with the exception of the fasteners and associated hardware used to fix mount 300 to the frame of a vehicle. Accordingly, like elements will retain their previously introduced reference numerals including a prime suffix and will not be discussed in detail.

Mount 300 includes tubes 304 fixed to and overmolded by plastic body 50'. Each tube 304 includes a bore 316 extending its entire length. Fasteners 312 extend through bores 316 in a slip-fit arrangement. Each fastener 312 includes a threaded portion 320 adapted to mate with a corresponding internally threaded fastener (not shown) after mount 300 is positioned such that fasteners 312 extend through apertures formed in the vehicle frame. Retaining clips 324 restrict fasteners 312 from axial movement relative to second support member 18' but allow relative rotation thereto. Each fastener 312 includes a head portion 328 that is drivingly engageable by a cooperatively-shaped tool. A flange portion 332 of each fastener 312 abuts an end face 336 of tube 304. An opposite end face 340 of tube 304 abuts second support member 18'.

Figure 5:
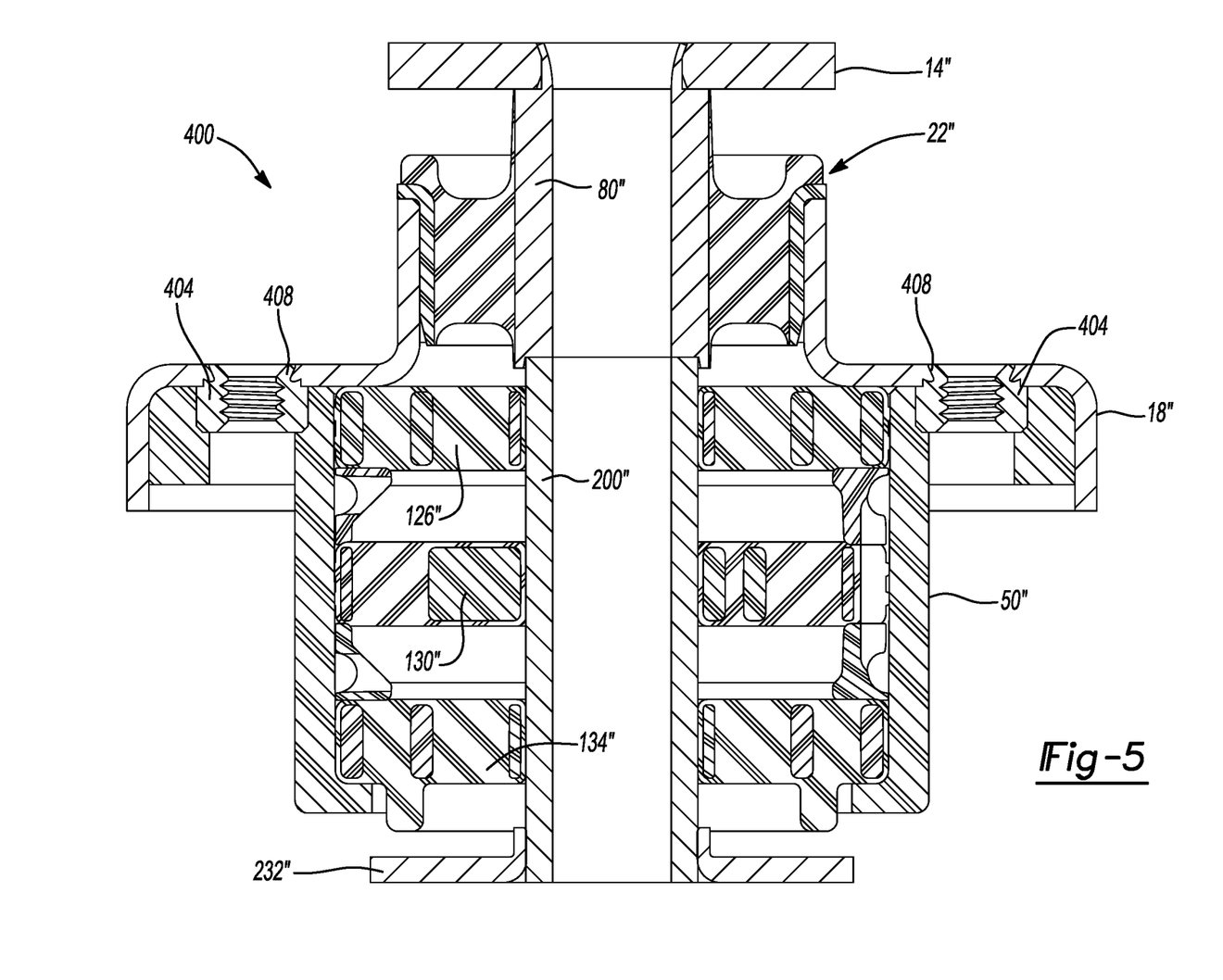
FIG. 5 is a cross-sectional view of another alternate embodiment mount.

FIG. 5 depicts another alternate mount identified at reference numeral 400. Mount 440 is substantially similar to the previously discussed mounts. Like elements are identified with reference numerals having a double prime suffix. Mount 400 differs in that captured nuts 404 replace elongated cap screws 312. Nuts 404 are overmolded within body 50" to fix their relative position. During assembly of mount 400 and after body 50" is positioned adjacent to second support member 18", nuts 404 are fixed to second support member 18" by mechanically deforming elongated portions 408 to clinch or otherwise fix nuts 404 in position. Other attachment methods including welding are contemplated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A body mount for connection between a body and a frame of a vehicle, comprising:
   a first support member defining a first support surface adapted to engage the body of the vehicle;
   an inner tube including a first end and an opposite second end, the inner tube connected to the first support member at the first end and extending axially away from the first support surface along a central axis;

a second support member defining a second support surface adapted to engage the frame of the vehicle, the second support member including a tubular portion disposed radially inward of the second support surface and extending axially away from the second support surface and toward the first support surface;

a first elastomeric spring interconnecting the inner tube and the second support member, the first elastomeric spring being positioned within the tubular portion;

a hydraulic damping system disposed on a side of the second support surface opposite the first support surface, the hydraulic damping system including a housing coupled to the second support member as well as second, third and fourth elastomeric springs positioned within the housing, the second elastomeric spring and the third elastomeric spring being spaced apart by a first track, the third elastomeric spring and the fourth elastomeric spring being spaced apart by a second track.

2. The body mount of claim 1, wherein the second elastomeric spring, the first track and the third elastomeric spring define a first fluid chamber and wherein the third elastomeric spring, the second track, and the fourth elastomeric spring define a second fluid chamber spaced apart from the first fluid chamber.

3. The body mount of claim 2, wherein the first track includes a port extending therethrough to interconnect the first fluid chamber with a first channel extending about at least a portion of the periphery of the first track.

4. The body mount of claim 3, wherein the second fluid track includes a second port extending therethrough to interconnect the second fluid chamber with a second channel extending about at least a portion of the periphery of the second track.

5. The body mount of claim 4, wherein the third elastomeric spring includes a recess fluidly interconnecting the first channel with the second channel such that the first fluid chamber is in fluid communication with the second fluid chamber.

6. The body mount of claim 1, wherein each of the second elastomeric spring, the third elastomeric spring, and the fourth elastomeric spring are cylindrically shaped as a puck.

7. The body mount of claim 1, wherein each of the second elastomeric spring, the third elastomeric and the fourth elastomeric spring include an inner ring spaced apart from and circumferentially surrounded by an outer ring, wherein the inner ring and the outer ring are encapsulated by an elastomer.

8. The body mount of claim 7, wherein the inner ring and the outer ring are constructed from a plastic material.

9. The body mount of claim 1, wherein each of the second elastomeric spring, the third elastomeric spring and the fourth elastomeric spring include an aperture extending therethrough and in receipt of the inner tube.

10. The body mount of claim 1, wherein each of the second elastomeric spring, the third elastomeric spring and the fourth elastomeric spring are engaged with an outer surface of the inner tube such that axial translation of the inner tube causes deflection of each of the second, third and fourth elastomeric springs.

11. The body mount of claim 1, wherein the housing is a one-piece member constructed from a plastic material.

12. The body mount of claim 1, wherein the second support member includes a constant-thickness metal sheet.

13. The body mount of claim 1, further including a first threaded fastener and a second threaded fastener at least partially encapsulated by the housing.

14. The body mount of claim 13, wherein each fastener includes an anti-rotation feature engaged by the housing.

15. The body mount of claim 1, wherein the inner tube includes a first tube positioned in engagement with a second tube, wherein the first tube extends through and is bonded to the first elastomeric spring.

16. The body mount of claim 1, wherein the first elastomeric spring includes a case circumferentially surrounding an elastomer, the case being press fit to the cup portion of the second support member.

17. The body mount of claim 1, further including a travel limiter fixed to the second end of the inner tube, wherein an axial translation of the inner tube in a first direction is limited by the fourth elastomeric spring and the travel limiter.

18. The body mount of claim 17, wherein translation of the inner tube in a second axial direction opposite the first axial direction is limited by the first support member and a bumper of the first elastomeric spring.

19. A body mount for connection between a body and a frame of a vehicle, comprising:
a first support member defining a first support surface adapted to engage the body of the vehicle;
an inner tube including a first end and an opposite second end, the inner tube connected to the first support member at the first end and extending axially away from the first support surface along a central axis;
a second support member defining a second support surface adapted to engage the frame of the vehicle, the second support member being movable relative to the first support member and including a tubular portion extending axially away from the second support surface and toward the first support surface;
a first elastomeric spring interconnecting the inner tube and the second support member, the first elastomeric spring being positioned within the tubular portion;
a hydraulic damping system disposed on a side of the second support surface opposite the first support surface, the hydraulic damping system including a housing coupled to the second support member as well as second, third and fourth elastomeric springs positioned within the housing, the second elastomeric spring and the third elastomeric spring being spaced apart by a first track, the third elastomeric spring and the fourth elastomeric spring being spaced apart by a second track, the hydraulic damping system including a first fluid chamber axially positioned between the second elastomeric spring and the third elastomeric spring and a second fluid chamber axially positioned between the third elastomeric spring and the fourth elastomeric spring, the first fluid chamber being continuously fluidly connected to the second fluid chamber via the first and second tracks.

20. The body mount of claim 19, wherein a passage extends through the third elastomeric spring to fluidly interconnect first fluid chamber and the second fluid chamber.

* * * * *